US008118675B2

(12) United States Patent
Horowitz et al.

(10) Patent No.: US 8,118,675 B2
(45) Date of Patent: Feb. 21, 2012

(54) SYSTEM AND METHOD FOR RELAYING RACE INFORMATION

(75) Inventors: Jeffrey R Horowitz, Sherman Oaks, CA (US); Henry P Stapp, Santa Clarita, CA (US); Ruben M Pegorer, Encino, CA (US); Jeff Franklin, Monrovia, CA (US)

(73) Assignee: Youbet.com, LLC, Louisville, KY (US)

( * ) Notice: Subject to any disclaimer, the term of this patent is extended or adjusted under 35 U.S.C. 154(b) by 1529 days.

(21) Appl. No.: 10/940,865

(22) Filed: Sep. 14, 2004

(65) Prior Publication Data

US 2005/0059495 A1 Mar. 17, 2005

Related U.S. Application Data

(60) Provisional application No. 60/503,117, filed on Sep. 15, 2003.

(51) Int. Cl.
*A63F 13/00* (2006.01)

(52) U.S. Cl. ................. 463/42; 463/25; 463/28; 463/40

(58) Field of Classification Search .................... 463/25, 463/28, 40, 41, 42, 43
See application file for complete search history.

(56) References Cited

U.S. PATENT DOCUMENTS

| | | | | |
|---|---|---|---|---|
| 5,573,244 | A | 11/1996 | Mindes | |
| 5,830,068 | A * | 11/1998 | Brenner et al. | 463/42 |
| 5,842,921 | A | 12/1998 | Mindes et al. | |
| 6,004,211 | A | 12/1999 | Brenner et al. | |
| 6,089,981 | A | 7/2000 | Brenner et al. | |
| 6,099,409 | A | 8/2000 | Brenner et al. | |
| 6,186,502 | B1 | 2/2001 | Perkins | |
| 6,267,669 | B1 | 7/2001 | Luciano, Jr. et al. | |
| 6,379,245 | B2 | 4/2002 | De Keller | |
| 6,544,121 | B2 | 4/2003 | DeWeese et al. | |
| 6,554,708 | B1 | 4/2003 | Brenner et al. | |
| 6,554,709 | B1 | 4/2003 | Brenner et al. | |
| 6,634,946 | B1 | 10/2003 | Bridgeman et al. | |
| 6,674,448 | B1 | 1/2004 | Garahi et al. | |
| 6,695,701 | B2 | 2/2004 | Aronson et al. | |
| 6,712,701 | B1 * | 3/2004 | Boylan et al. | 463/42 |
| 6,735,487 | B1 | 5/2004 | Marshall et al. | |
| 2002/0078209 | A1 * | 6/2002 | Peng | 709/227 |
| 2004/0224675 | A1 * | 11/2004 | Puskoor et al. | 455/419 |

* cited by examiner

*Primary Examiner* — James McClellan
(74) *Attorney, Agent, or Firm* — Howard & Howard Attorneys PLLC

(57) ABSTRACT

A system and method for relaying race information related to a plurality of races, such as horse or greyhound races, typically held at racetracks. The system includes a computer system that receives and stores current race information from the plurality of races. The system also includes a remote device coupled to the computer system. A user operating the remote device can view race information and place wagers on the races. The method begins by the computer system sending initial race information to the remote device. As current race information is received from the racetracks, the computer system compares current race information with the initial race information sent to the remote device. The computer system then sends updated race information to the remote device. This updated race information includes only race information that has changed since the initial race information was sent from the computer system to the remote device.

34 Claims, 16 Drawing Sheets

24

SYSTEM AND METHOD FOR RELAYING RACE INFORMATION

CROSS-REFERENCES TO RELATED APPLICATIONS

This application claims the benefit of U.S. Provisional Application No. 60/503,117, filed Sep. 15, 2003.

FIELD OF THE INVENTION

The subject invention relates to a system and method for wagering on races, such as a horse or greyhound races. Particularly, the subject invention relates to a system and method for relaying information related to such races.

BACKGROUND OF THE INVENTION

Various systems and methods for wagering on races are well known in the prior art. An example of such a system and method is disclosed in U.S. Pat. No. 5,830,068 to Brenner et al. (the '068 patent).

The '068 patent discloses a wagering system for facilitating data communication between racetracks and user terminals. The user terminals allow a user to view information on upcoming races and place wagers on the races. The wagering system includes a computer system for receiving the information from the racetracks and sending the information to the user terminals via a network. The information sent to the user terminals is updated periodically to reflect the most recent data from the racetracks. However, data traffic on the network will increase as the number of user terminals increases. This creates a strain on the network and the computer system itself. This strain on the network may result in lost or delayed data. Thus, the user may not have the most up-to-date information from the racetracks needed to place an educated wager.

The present invention is aimed at one or ore of the problems identified above.

SUMMARY OF THE INVENTION AND ADVANTAGES

The subject invention provides a system for relaying race information related to a plurality of races. The system includes a computer system coupled to a remote device. The computer system receives and stores current race information. The remote device receives initial race information from the computer system. The computer system then compares the initial race information sent to the remote device with the current race information. The remote device then receives updated race information, including only race information that has changed since receiving the initial race information.

The subject invention also provides a method of relaying race information related to a plurality of races from a computer system to a remote device. The method includes the steps of receiving and storing current race information on the computer system, receiving, at the remote device, initial race information from the computer system, and comparing, at the computer system, the initial race information with the current race information and sending to the remote device updated race information, the updated race information including only race information that has changed.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
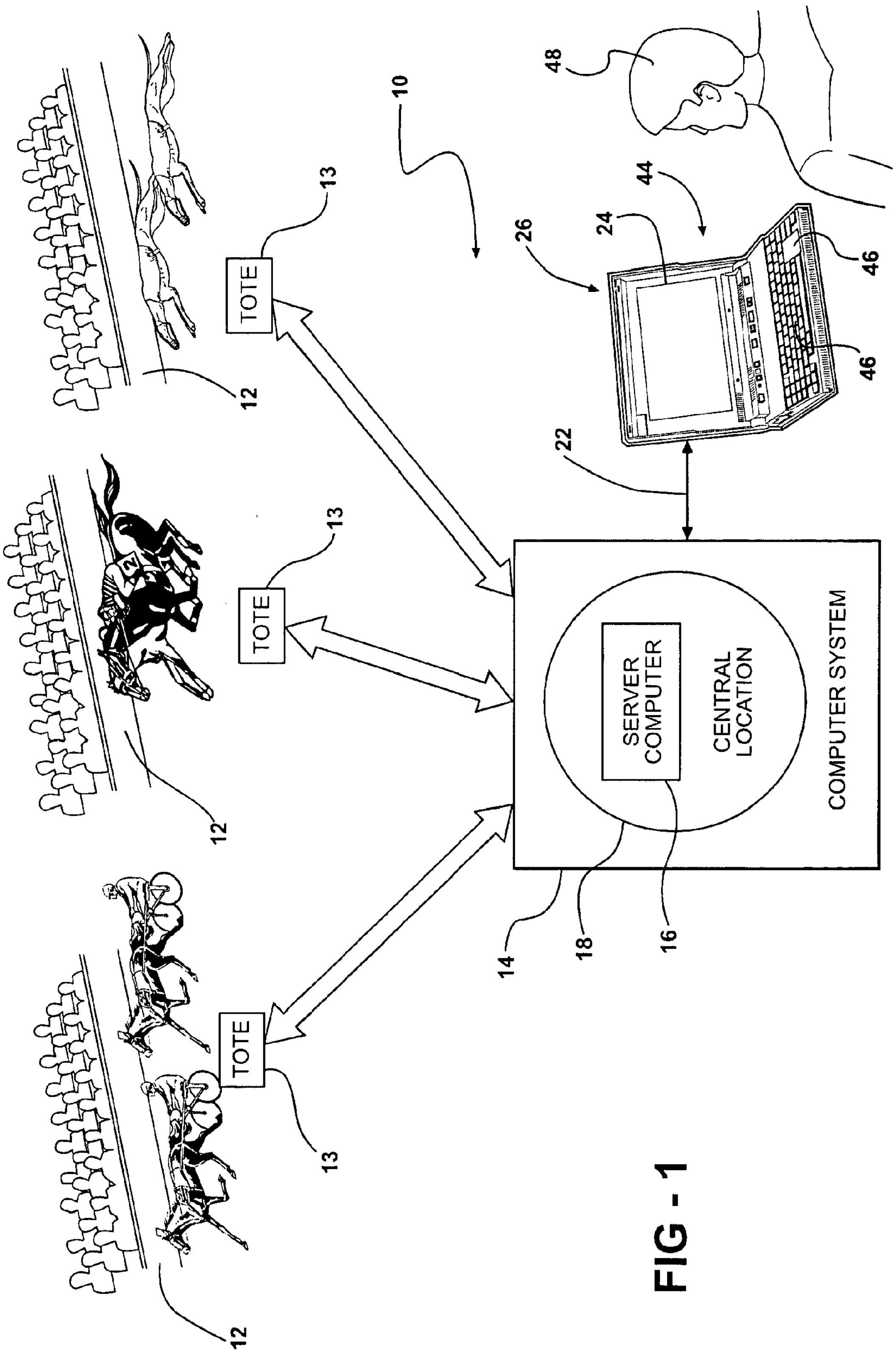
FIG. 1 is a block diagram showing a system for relaying race information.

Referring to the Figures, wherein like numerals indicate like parts throughout the several views, a system for relaying race information related to a plurality of races is shown at 10 in FIG. 1.

Each race of the plurality of races is typically located on a racetrack 12. Commonly, these races are contests between horses driven by jockeys or between greyhounds chasing an artificial rabbit lure. However, other types of races may be utilized by the system, such as races between humans, automobiles, etc., with or without a racetrack.

Each race typically has a plurality of entrants. It is routine, especially with horse and greyhound racing, for spectators to place wagers on the performance of the entrants. This wagering typically occurs before each race begins or before a series of races begin. Therefore, the term "race", as used herein, may be extended to include a next race to be run. The race information relayed by the system 10 may include, but is not limited to, one of more of the following: odds of winning associated with each entrant, track conditions, changes related to the race, exotic odds information, wager pool totals, combination wager odds, will pays information, race results, and exotic results.

Wagering on horse and greyhound races most often follows a pari-mutuel gambling model. In pari-mutuel gambling, the winners divide, in proportion to their wagers, the total amount bet, minus a percentage for track operators, taxes, etc. As betting on the several entrants progresses, the total mount bet, as well as the amount bet on each entrant changes. Thus, the payout odds for each entrant changes as well.

Various bet types are common in pari-mutuel horse and greyhound gambling. For example, a "win" bet will pay off if the entrant wins (finishes first) the race, a "place" bet pays if the entrant comes in first or second, and a "show" bet pays if the entrant finishes in the top three. Other exotic odds bet types are also commonly available to pari-mutuel gamblers. Examples of exotic odds bets types include a "daily double" bet where the object is to pick the winners of two consecutive races (typically the first two races of the day), an "exacta" (or "perfecta") in which the top two finishers, in finishing order, must be picked, or a "trifecta" where the top three finishers are picked in finishing order.

To accomplish the complex calculation of odds and payout amounts for the multitude of available bet types, each racetrack 12 employs a calculating system known as a totalisator 13, commonly abbreviated as a tote 13. Each tote 13 tracks the amount of money wagered on each entrant in each race and the form of each wager (win, place, show, part of a trifecta, etc.).

The system 10 of the present invention includes a computer system 14 in operative communication with a tote 13 associated with each racetrack 12. In one embodiment of the present invention, the computer system 14 includes at least one server computer 16 located at a central location 18. However, those skilled in the art will realize that the computer system 14 may include more than one server computer 16 at the central location 18 or multiple computers 16 spread out at a plurality of locations.

A remote device 20 is coupled to the computer system 14. The remote device 20 may be implemented as a computer terminal, a personal computer, a telephone, a laptop computer, a notebook computer, a portable gaming device, a personal digital assistant, or any other suitable device. The remote device 20 includes an output interface 44 to deliver information to a user 48 and an input interface 46 for the user 48 to input commands or selections. The output interface, in one embodiment, includes a display 24 for viewing the information. The input interface 46 may include a keyboard, keypad, mouse, touchscreen, etc. The remote device 20 allows the user 48, via the input interface 46, to select at least one race to view from a larger set of races. The user 48 can also select a plurality of races to view simultaneously.

The system 10 further includes a communication network 22 for coupling the computer system 14 and the remote device 20. The network 22 utilizes hard-wired transmission of data, wireless transmission of data, or a combination of hard-wired and wireless transmission of data. Examples of networks with hard-wired transmission of data include, but are not limited to, the plain-old telephone service (POTS), fiber-optic communication cables, and Ethernet cables. Examples of networks with wireless transmission of data include, but are not limited to cellular telephone networks, personal communication system (PCS) networks, Wi-Fi networks, or Bluetooth.

Figure 2:
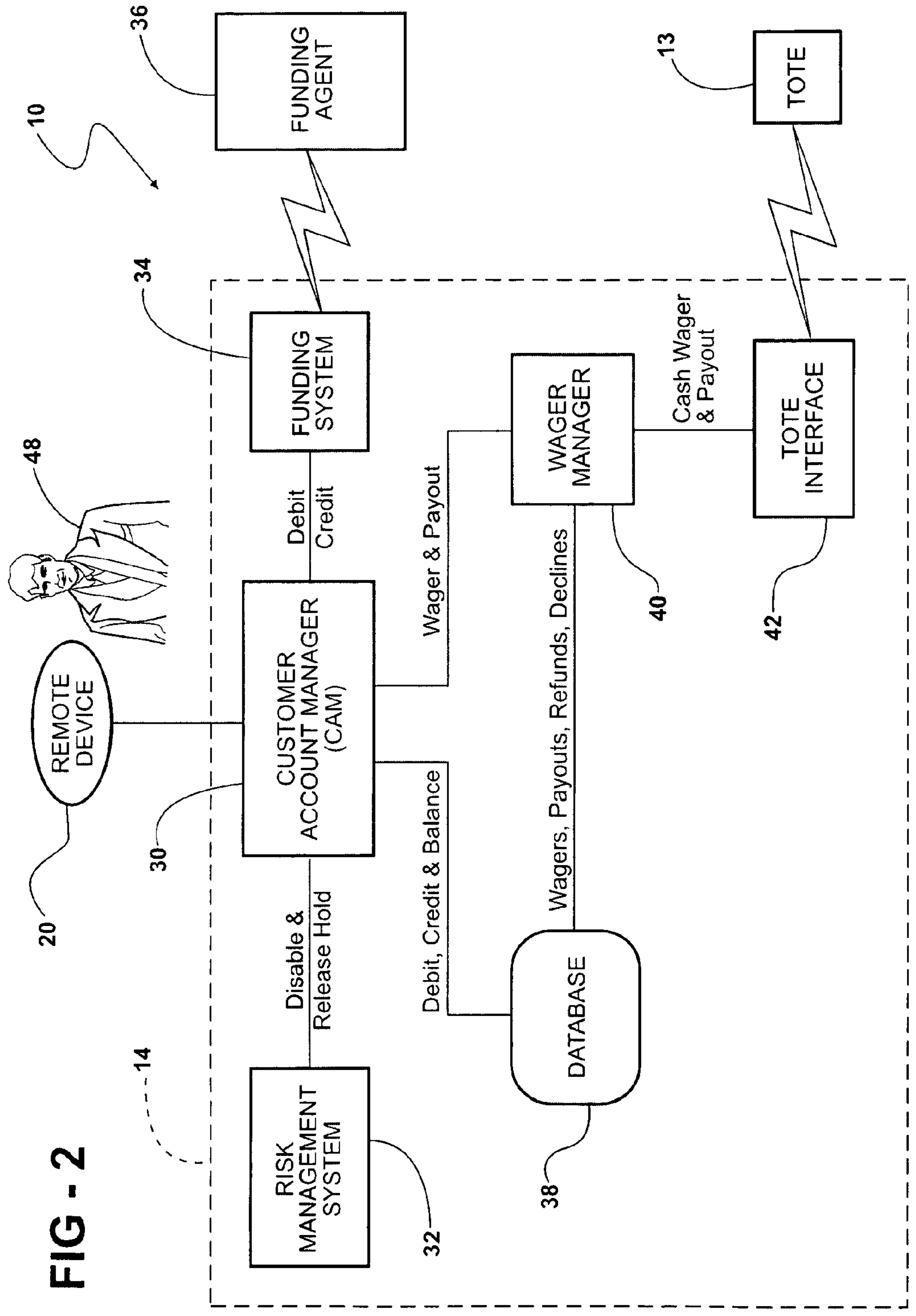
FIG. 2 is a block diagram showing a computer system and various components of the computer system.

Referring to FIG. 2, in one embodiment, the computer system 14 includes a customer account manager (CAM) 30 implemented in software. The CAM 30 manages all financial activities associated with a wagering account associated with the user 48. The CAM 30 is in operative communication with a risk management system 32 and a funding system 34. The risk management system 32 assists the CAM 30 in determining whether to accept a wager. The funding system 34 acts as an interface between funding agents 36, such as banks and other financial institutions.

The computer system 14 may also include a database 38 and a wager manager 40 in operative communication with each other and the CAM 30. In one embodiment, the database 38 is a structured query language (SQL) server. However, other types of databases are well known to those skilled in the art and can be implemented instead of the SQL server. The database 38 stores data related to the wager account of the user 48.

The wager manager 40 operatively communicates with a tote interface 42, which is in operative communication with the tote 13 at each racetrack 12. In one embodiment, only wager-related data is sent from the wager manager 40 to the tote interface 42. No user-specification information, such as an identity of the user 48, is sent to the tote interface 42. Therefore, the totes 13 at the various racetracks 12 never know the identity of the user 48 placing the wager and the wager is treated as an anonymous cash transaction.

Figure 3:
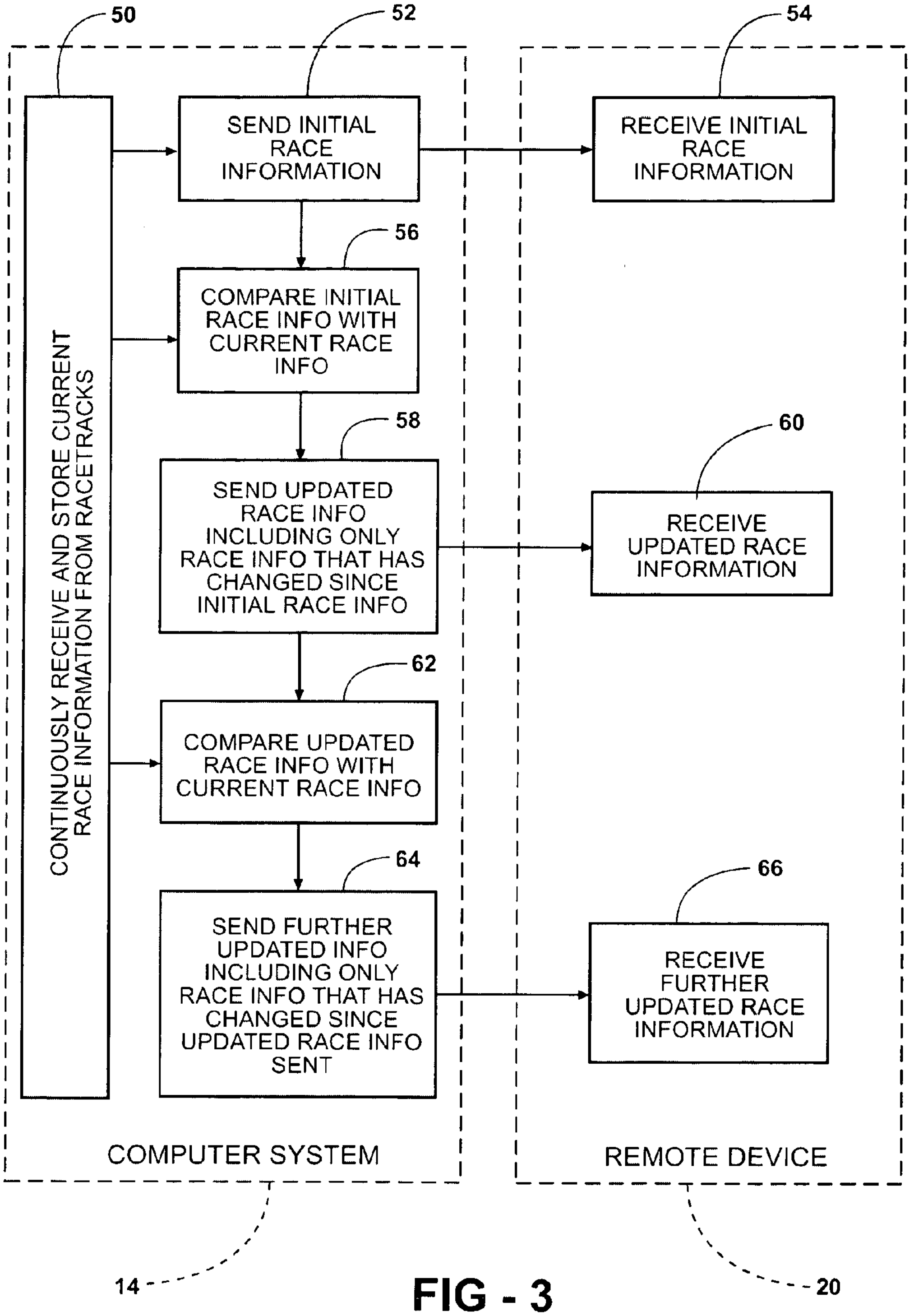
FIG. 3 is a flowchart detailing steps in a method of the present invention.

Referring now to FIG. 3, in a first step 50, the computer system 14 continuously receives and stores current race information from the race tracks 12. This race information includes, but is not limited to, the odds of winning associated with each entrant, track conditions, changes related to the race (scratched entrants, etc.), exotic odds information, wager pool totals, combination wager odds, will pays information, race results, and exotic results.

In a second step 52, the computer system 14 sends initial race information to the remote device 20 and in a third step 54, the remote device 20 receives the initial race information. The initial race information is a first transmission of race information. As the wagering prior to a race proceeds and the race progresses, the race information changes. For example, odds for each entrant typically changes, some entrants may be scratched, the weather conditions at the racetrack 12 may change, etc. In a fourth step 56, the computer system 14 compares the initial race information sent to the remote device 20 with the current race information. Based on this comparison, the computer system 14 generates updated race information The updated race information includes only race information that has changed since the initial race information was sent. The computer system 14 may filter the updated race information based on what races have been chosen by the user to view at the remote device 20. The computer system 14 then prepares a data package containing the updated race information at periodic intervals. The data package includes a data message sequence which identifies the race information which has been updated. In a fifth step 58, the data package containing the updated race information is then transmitted to the remote device 20. The updated race information is received by the remote device 20 in a sixth step 60.

The computer system 14 continues repeatedly in this fashion. In a seventh step 62, the updated race information is compared with the current race information. Further updated race information, including only the race information that has changed, is generated. The further updated information is sent from the computer system 14 to the remote device 20 in an eighth step 64. In a ninth step 66, the remote device 20 receives the further updated race information. By only sending the race information that has changed since the transmission of the data package, bandwidth of the network 22 is conserved.

Some race information may be more critical to the user 48 than other race information. For instance, the odds of winning for each entrant may be of greater importance than track conditions. Therefore, the race information may be broken into more than one piece of data, such as first and second pieces of data. The first piece of data is sent at a first periodic interval and the second piece of data at a second periodic interval. For example, the first piece of data (e.g. odds of winning for each entrant) is sent every 5 seconds, while the second piece of data (e.g. track conditions) is sent every 60 seconds. Even when breaking the race information down into more than one piece of data, the computer system 14 still sends only race information that has changed since the last transmission of data.

Figure 4:
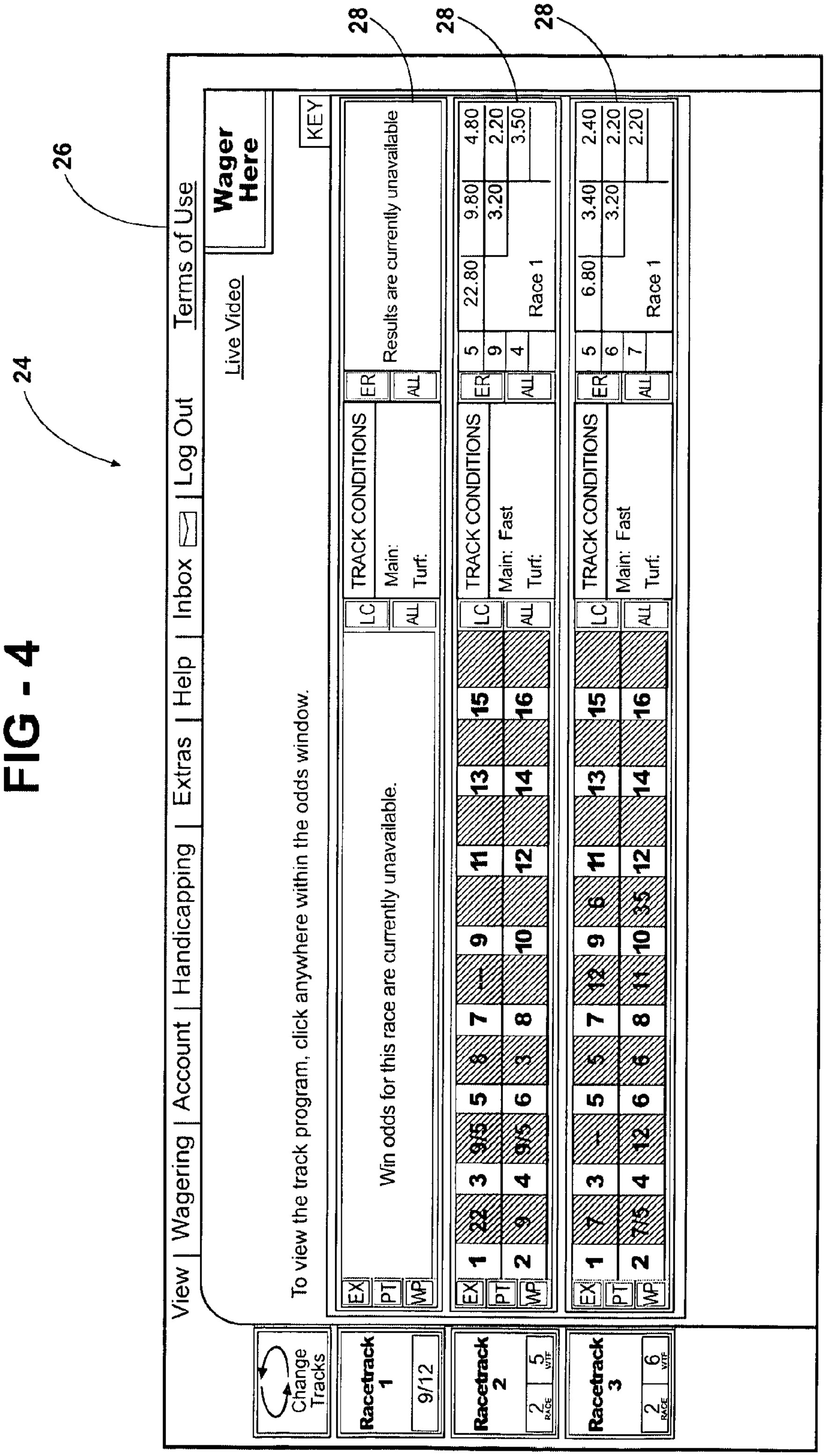
FIG. 4 is a block diagram representing a screen image of a unified user interface shown on a remote device of the present invention.

As shown in FIGS. 4-17, the display 24 of the remote device 20 displays a unified user interface 26 for simultaneously showing the race information for each of the plurality of races. The unified user interface 26 allows the user 48 to select the plurality of races that are to be displayed from a larger set of races. The unified user interface 26 also allows the user 48 to select a plurality of racetracks 12. Each of the plurality of races is located at one of the plurality of racetracks 12. In one embodiment, the unified user interface 26 includes a plurality of strips 28. Each strip 28 corresponds to one of the plurality of racetracks and displays the updated race information pertaining to at least one race located at the corresponding racetrack 12. As shown in the FIG. 4, each strip 28 includes each entrant's current odds of winning the next race, the current track conditions, and the payouts for win, place and show. However, the strips 28 of the unified user interface 26 may be configured to display other race information.

Figure 5:
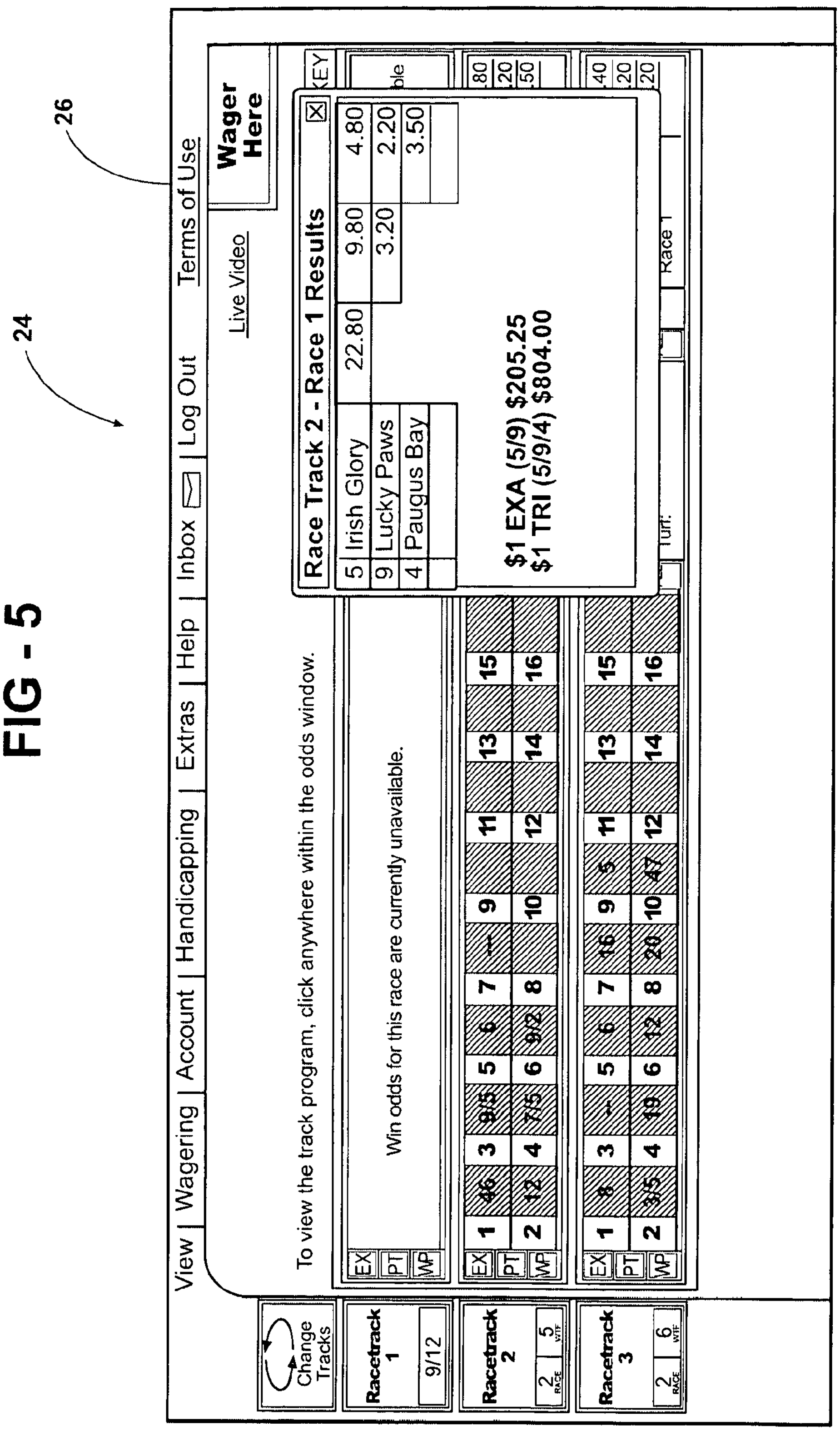
FIG. 5 is a block diagram of the unified user interface showing an "all results" popup window.

The unified user interface 26 allows the user 48 to quickly access all previous race results from any particular racetrack 12. Each strip 28 includes an "ALL" button adjacent the payouts. In one embodiment, when the "ALL" button is selected via the input interface 46, an "all results" popup window appears, as shown in FIG. 5. The "all results" popup includes, among other things, the winner of the race and where the other horses placed, the payouts for a win, place and show and the payouts for the exotics.

Figure 6:
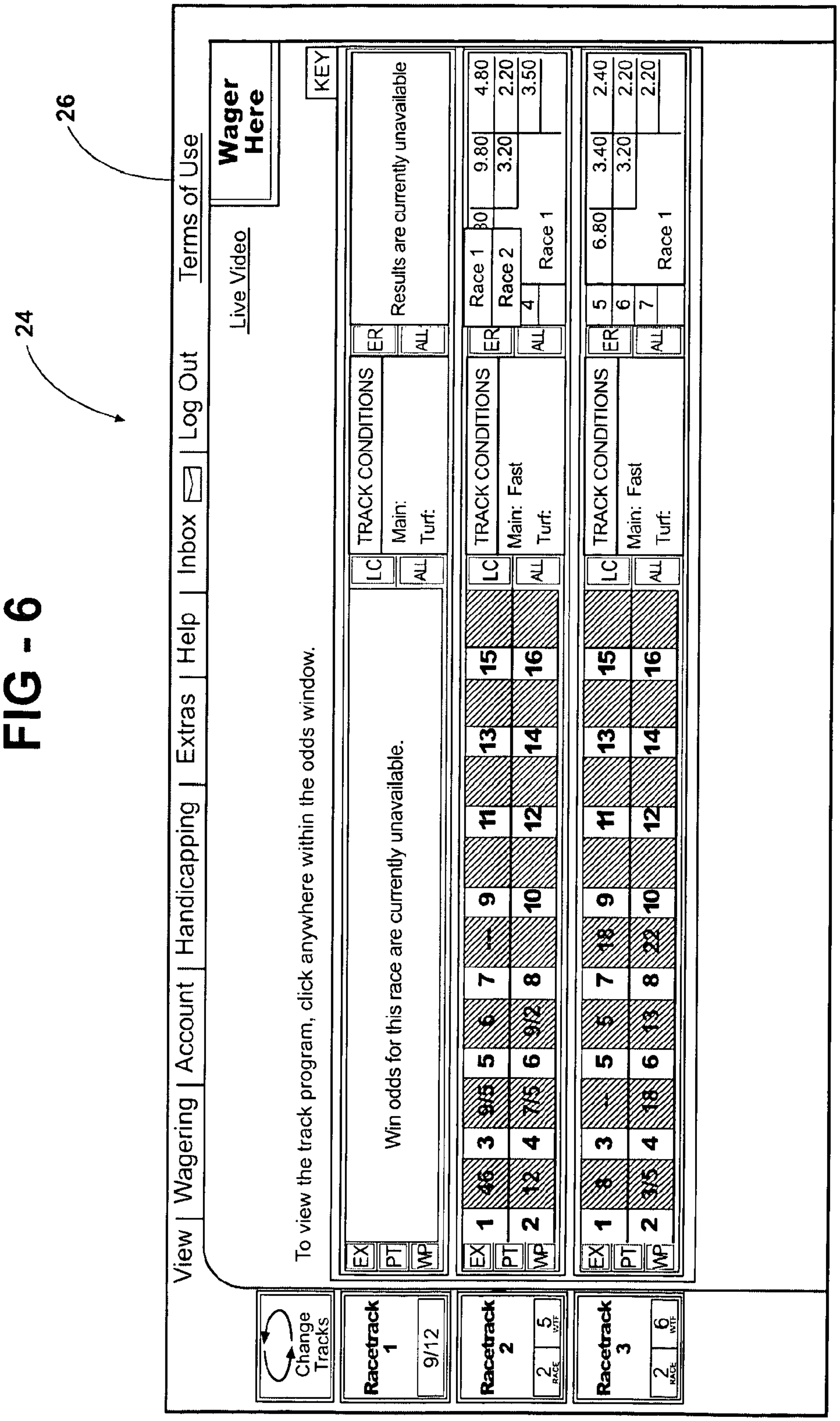
FIG. 6 is a block diagram of the unified user interface showing selection of an "ER" button.
Figure 7:
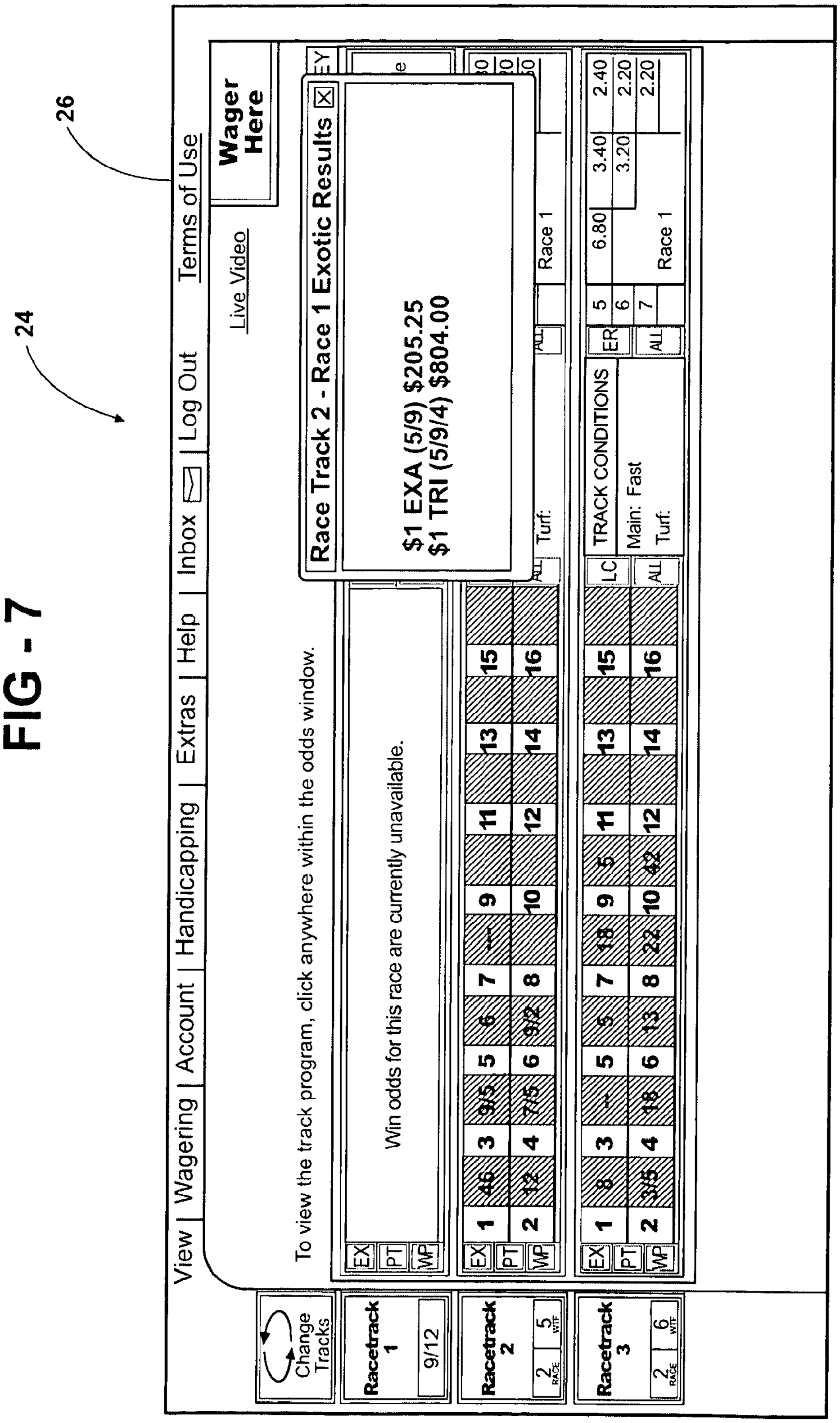
FIG. 7 is a block diagram of the unified user interface showing an "exotic results" popup window.

Referring to FIG. 6, the unified user interface 26 allows the user 48 to review exotic results from previous races at each racetrack 12 by selecting the "ER" button adjacent the payouts. After a particular race is selected, an "exotic results" popup window appears, as shown in FIG. 7. The information in the "exotic results" popup includes the results/payouts for the exotics.

Figure 8:
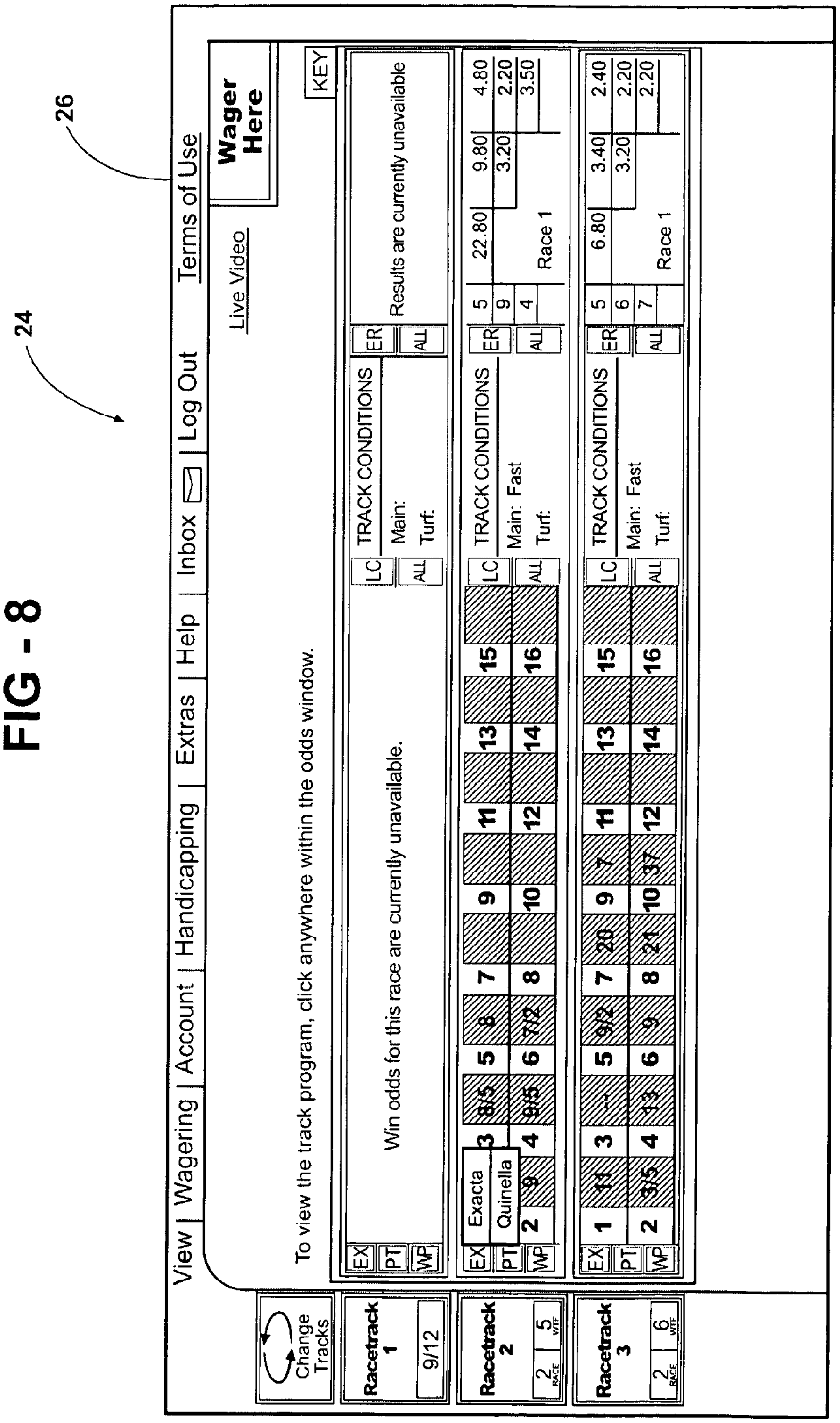
FIG. 8 is a block diagram of the unified user interface showing selection of an "EX" button.
Figure 9:
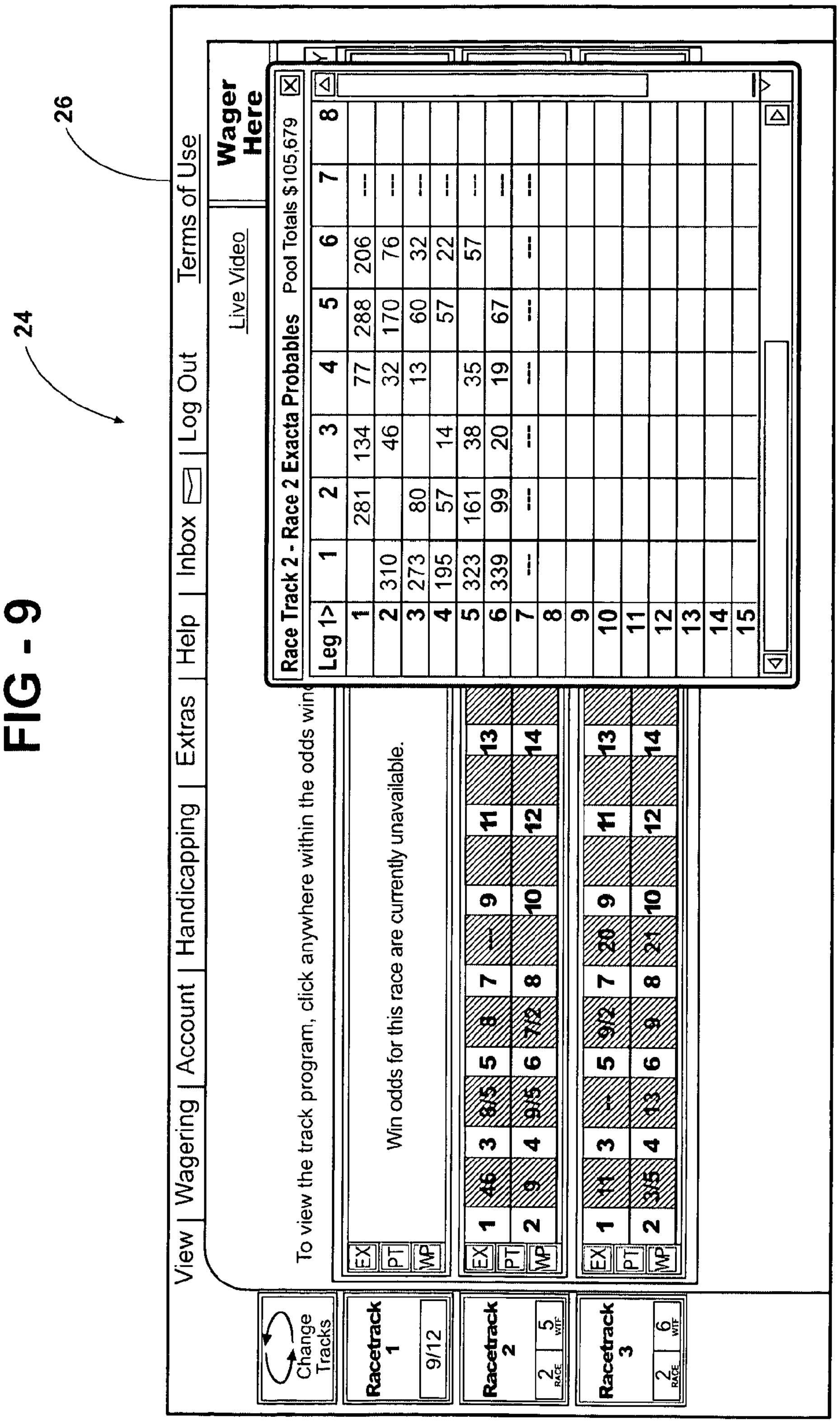
FIG. 9 is a block diagram of the unified user interface showing an "exotics" popup window.

The "exotic menu" feature, as shown in FIG. 8, is accessed by selecting the "EX" button adjacent each entrant's current win odds. The "exotic menu" allows the user 48 to access specific exotics (i.e., wagers typically involve the user selecting a combination of horses in one or more races such as so-called Exactas, Trifectas, Quinellas, Daily Doubles, etc.) information for the associated racetrack 12 and race(s). Referring to FIG. 9, in one embodiment, an "exotics" popup window allows the user to access to view the amounts wagered for a particular exotic wagering category (e.g. the so-called Exacta).

Figure 10:
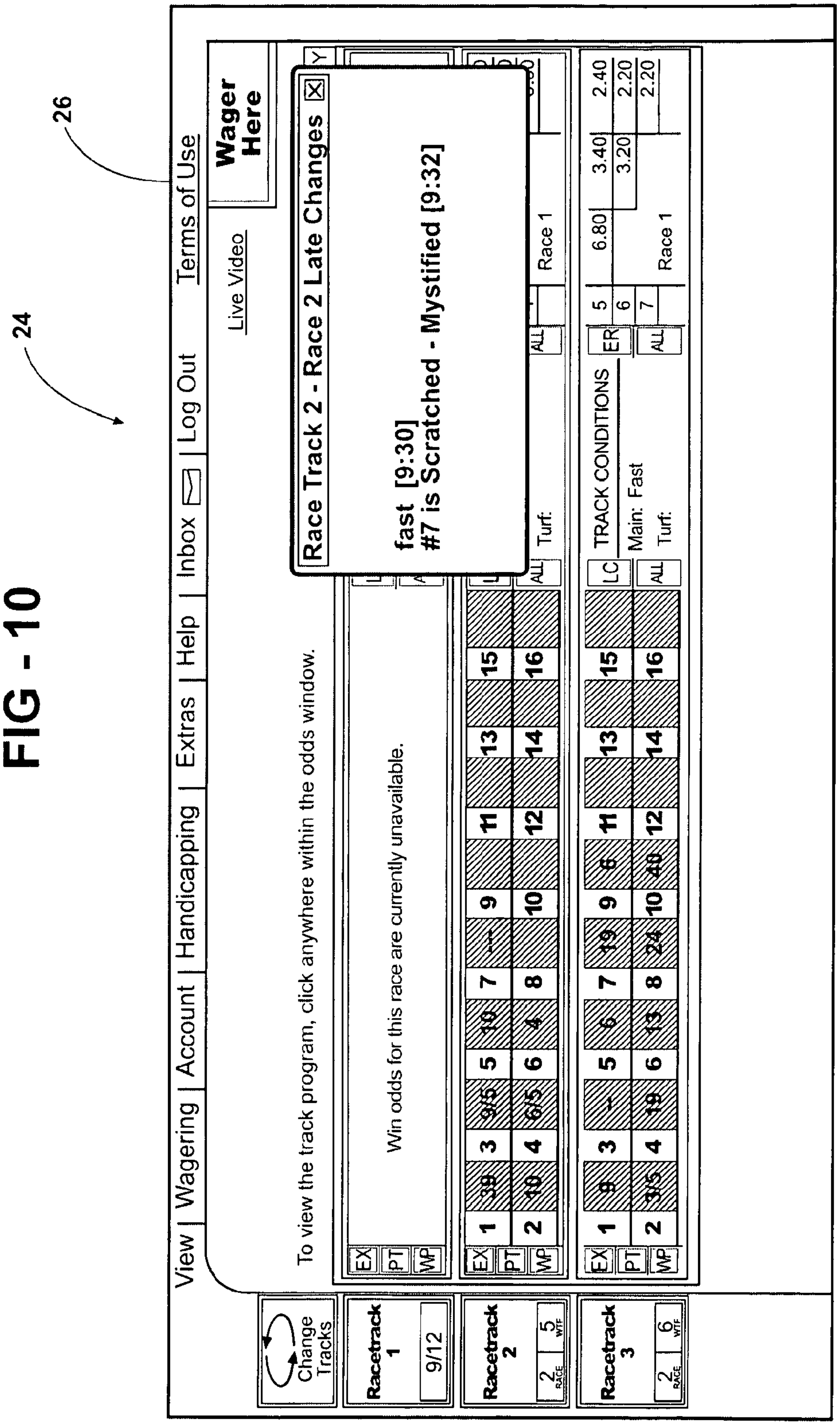
FIG. 10 is a block diagram of the unified user interface showing a "changes" popup window.

FIG. 10 shows a "changes" popup window accessed through the "LC" button adjacent the track conditions on each strip 28. The "changes" popup window allows the user 48 to review information that has recently changed before a race, such as race conditions and whether an entrant is scratched before the race.

Figure 11:
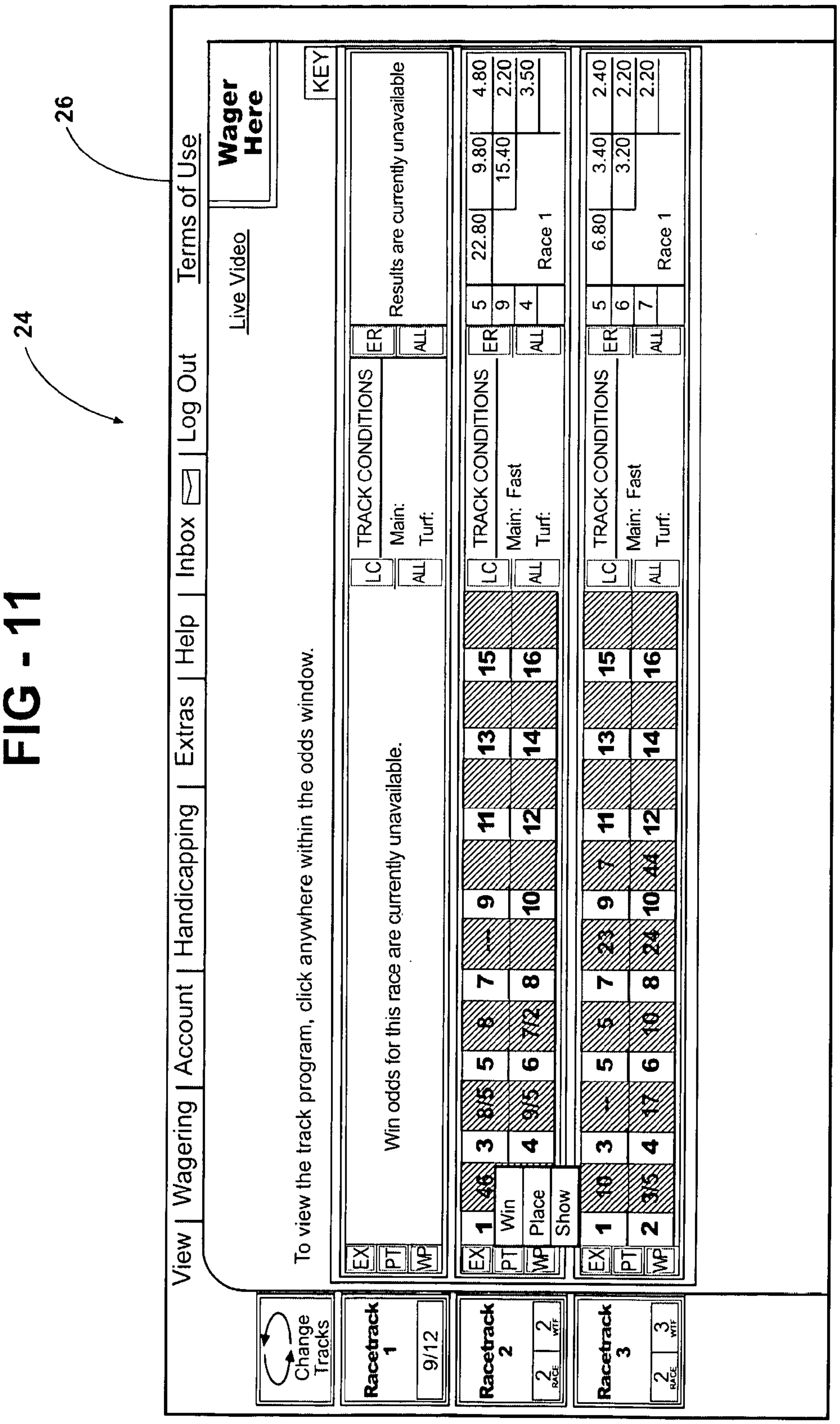
FIG. 11 is a block diagram of the unified user interface showing selection of a "PT" button.
Figure 12:
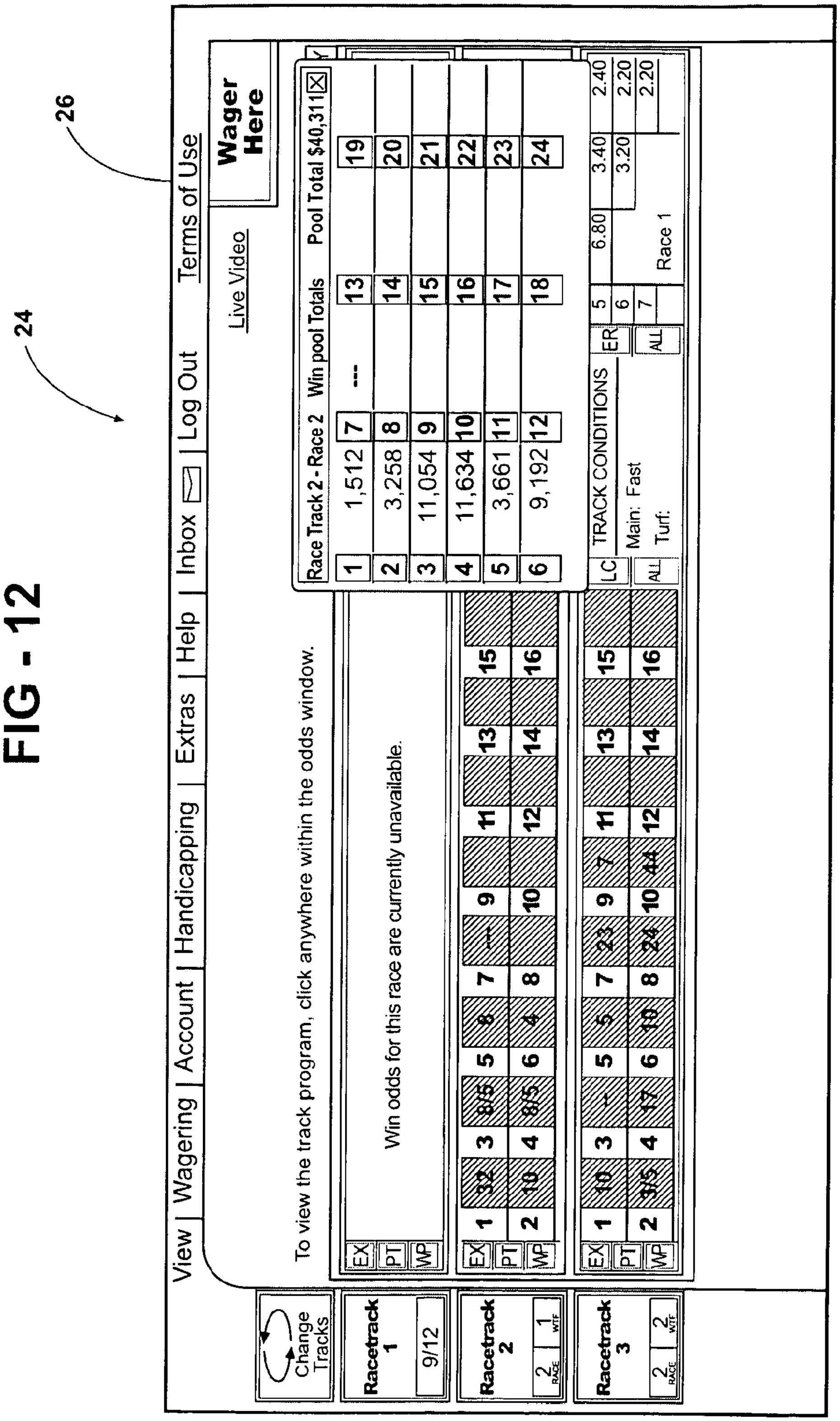
FIG. 12 is a block diagram of the unified user interface showing a "win pool totals" popup window.

The unified user interface 26 also allows the user 48 to view pool totals for win, place, and show. As shown in FIG. 11, the user 48 selects the "PT" button adjacent each entrant's current win odds. The user 48 can then select whether to view pool totals for win, place, or show. Once selected an appropriate popup window is opened. FIG. 12 shows a "win pool totals" popup displaying allowing the win pool totals for the race including the amount bet on each entrant in the race.

Figure 13:
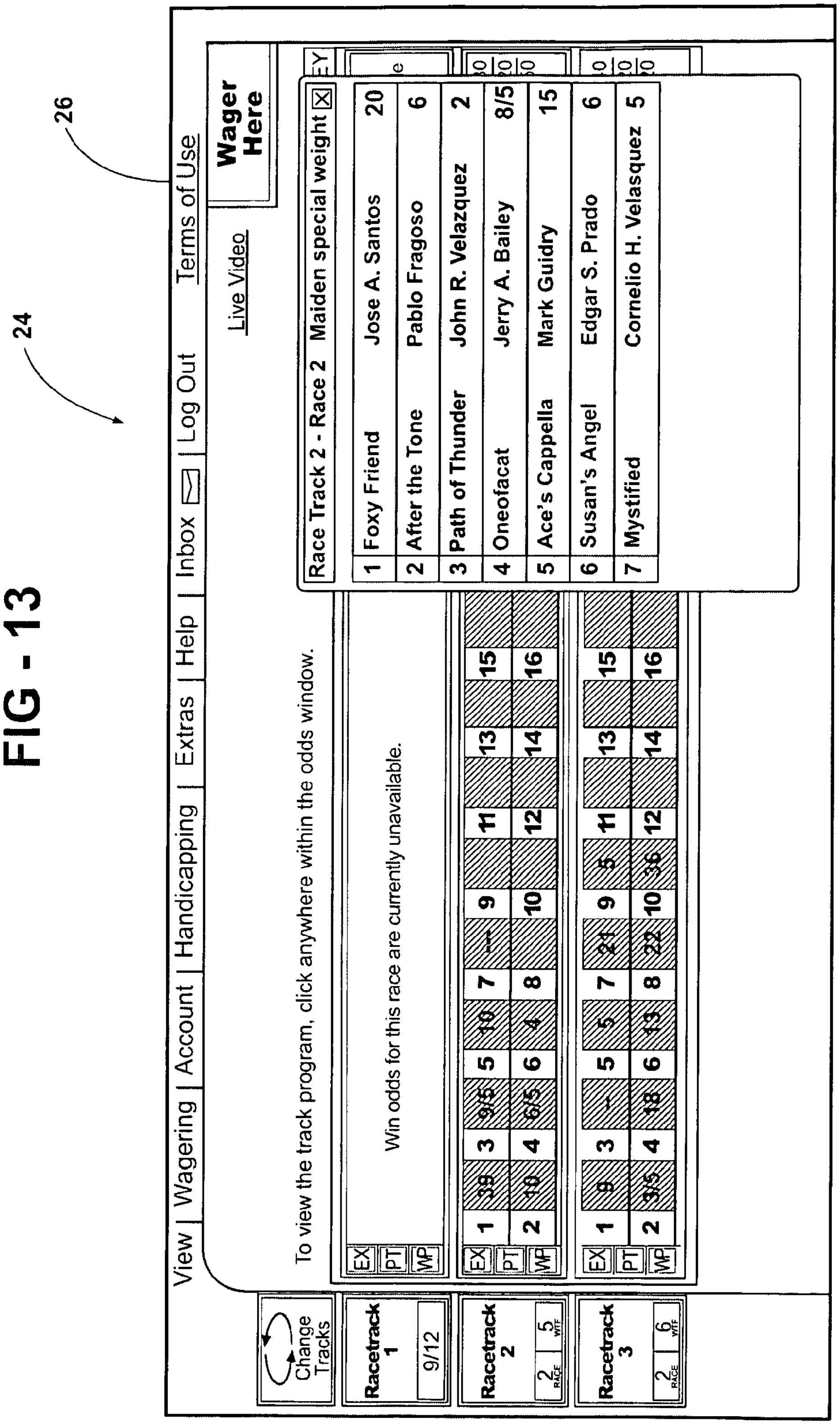
FIG. 13 is a block diagram of the unified user interface showing a "program" popup window.

A "program" popup window, as shown in FIG. 13, is accessed when the user 48 selects the entrant's current win odds section of the strip 28. The "program" popup allows the user 48 to view the specific, detailed information that would normally be available in a race program. For example, the user can see the number of horses racing, their names, their win percentage, any concessions or allowances (weight allowances, apprentice allowances, etc.), the jockeys, their weights, etc., for each race.

Figure 14:
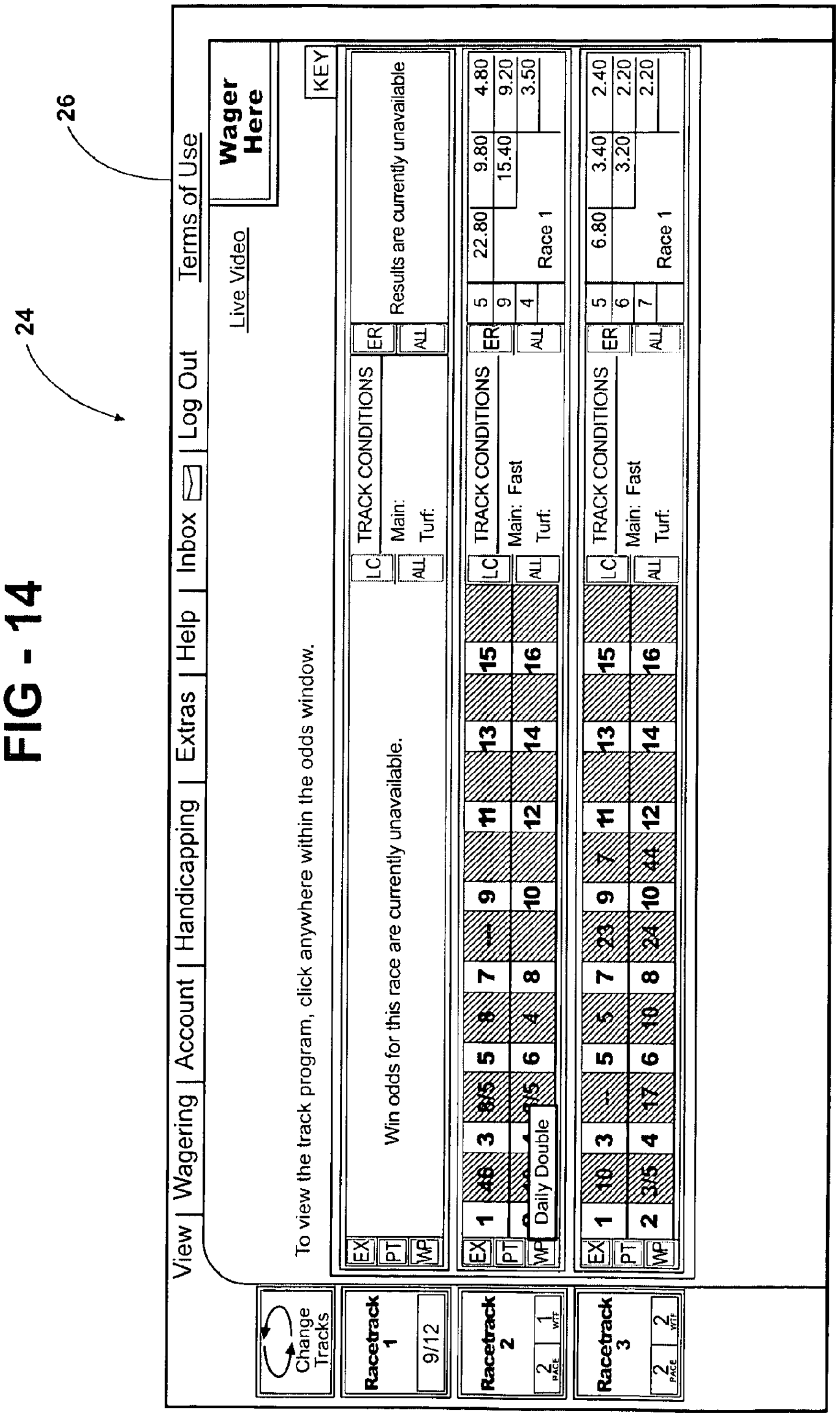
FIG. 14 is a block diagram of the unified user interface showing selection of a "WP" button.
Figure 15:
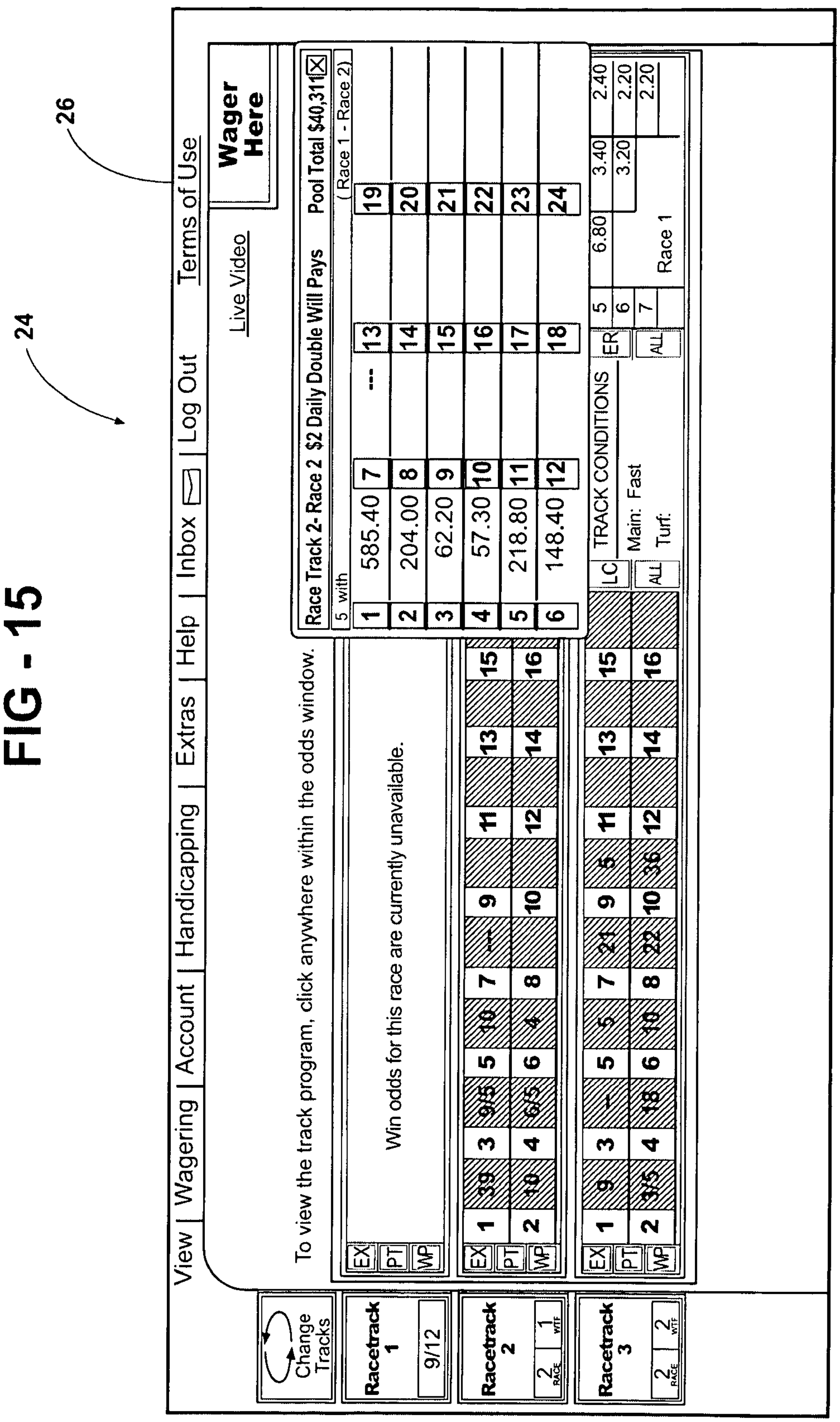
FIG. 15 is a block diagram of the unified user interface showing a "will pays" menu.

Referring now to FIG. 14, the user 48 can access a "will pays" by selecting the "WP" button adjacent each entrant's current win odds on strip 28. The "will pays" menu, shown in FIG. 15, allows the user 48 to view and select various pay features such as, but not limited to, daily doubles. For example, the user 48 can access the payout for a second race of a daily double after the first race has been run.

Figure 16:
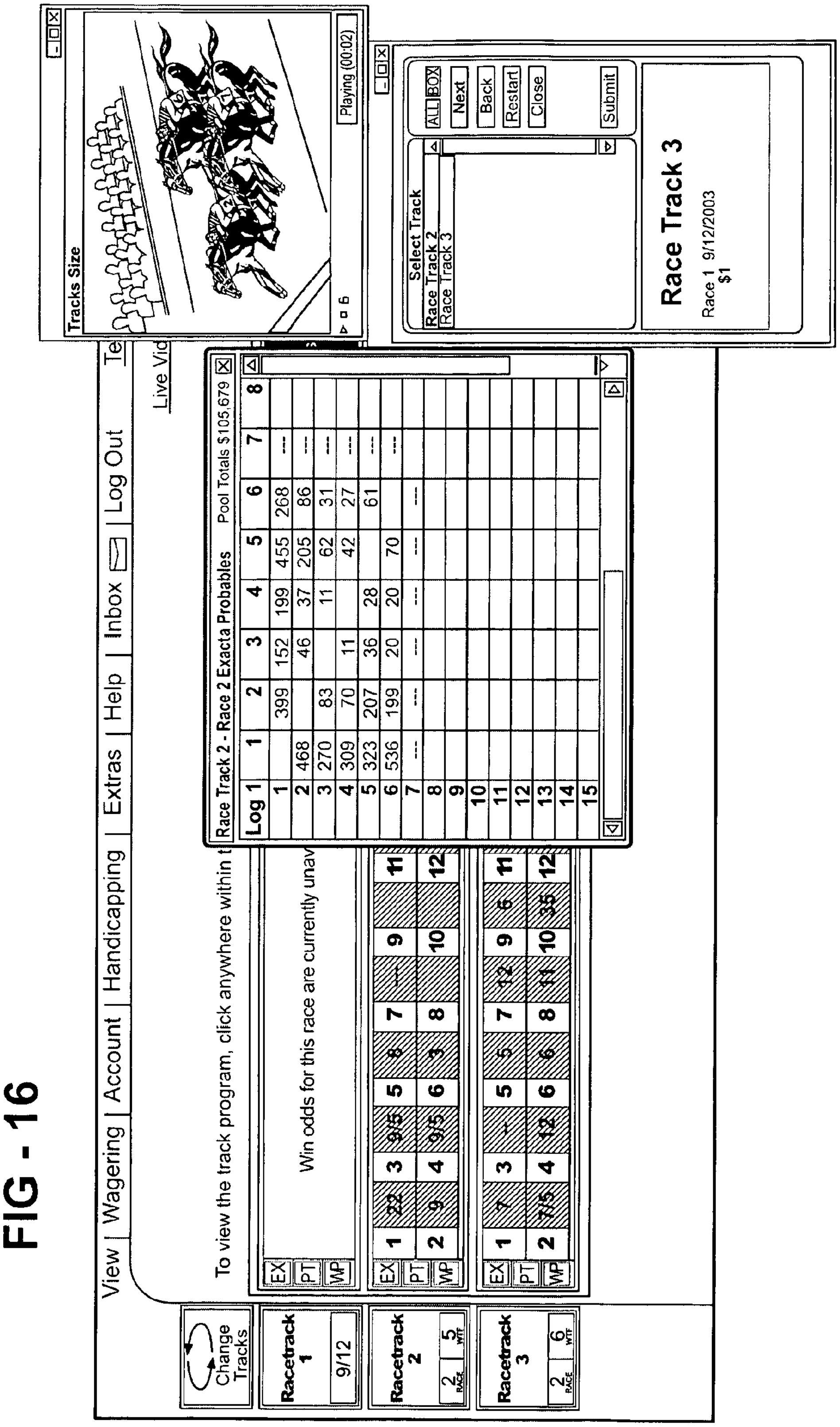
FIG. 16 is a block is a block diagram of the unified user interface showing a "wager pad" popup window and a live video feed of a selected race.

The remote device 20 allows the user 48 to place a wager on at least one of the races being viewed on the display 24. As shown in FIG. 16, a "wager pad" popup window is available via the unified user interface 26. Wager information is sent from the remote device 20 to the computer system 14. The computer system 14 then registers the wager with the tote 13 at the appropriate racetrack 12.

Racetracks 12 typically provide live video and audio feeds of their races, which are broadcast throughout the facility of the racetrack 12. These video and audio feeds are usually simulcast at other racetracks 12, off-track betting facilities, casinos, etc. The remote device 20 also allows the user 48 to view these live video feed and/or audio feeds of a selected race.

Obviously, many modifications and variations of the present invention are possible in light of the above teachings. The invention may be practiced otherwise than as specifically described within the scope of the appended claims.

What is claimed is:

1. A system for relaying race information related to a plurality of races, each race including a plurality of entrants, located on a racetrack, and employing at least one totalisator for tracking race information, comprising:

a computer system in communication with the at least one totalisator for receiving and storing current race information received from the at least one totalisator, wherein the race information includes current odds of winning associated with each entrant; and, a remote device coupled to the computer system via a network for allowing a user to select a subset of races from the plurality of races and sending the subset of races to the computer system, the computer system for receiving the subset of races and for filtering the race information based on the subset of races and delivering the filtered race information to the remote device, the remote device for receiving filtered initial race information from the computer system and for receiving filtered updated race information, the computer system for comparing the filtered initial race information sent to the remote device with the current race information, the filtered updated race information including only race information that has changed since the filtered initial race information was sent to the remote device;

said remote device including a display for delivering the filtered race information to a user; and said display displaying a unified user interface for simultaneously showing the filtered updated race information including the odds of winning at least two different current races located on at least two different racetracks.

2. A system, as set forth in claim 1, the remote device for receiving further updated race information from the computer system, the computer system for comparing the updated race information with the current race information received from the at least one totalisator, the further updated race information including only race information that has changed since the updated race information was sent to the remote device.

3. A system, as set forth in claim 1, the computer system including at least one server computer located at a central location.

4. A system, as set forth in claim 1, the remote device being one of a computer terminal, a personal computer, a telephone, a laptop computer, a notebook computer, a portable gaming device, and a personal digital assistant.

5. A system, as set forth in claim 1, each race being run at a racetrack, the race at a respective racetrack being a next race to be run.

6. A system, as set forth in claim 1, the remote device for allowing a user to select a plurality of racetracks from a larger set of racetracks, the plurality of races corresponding to a next race to be run at each selected racetrack.

7. A system, as set forth in claim 1, the unified user interface for allowing a user to select a plurality of race tracks, each of the plurality of races being located at one of the plurality of racetracks.

8. A system, as set forth in claim 7, the unified user interface including a plurality of strips, each strip corresponding to one of the plurality of racetracks and displaying the updated race information pertaining to at least one race located at the corresponding racetrack.

9. A system, as set forth in claim 1, the computer system preparing a data package containing the updated race information at periodic intervals and transmitting the data package to the remote device.

10. A system, as set forth in claim 9, the data package including a data message sequence which identifies the race information which has been updated.

11. A system, as set forth in claim 1, the race information including at least first and second pieces of data, the remote device receiving updated race information pertaining to the first piece of data at a first periodic interval and receiving updated race information pertaining to the second piece of data at a second periodic interval.

12. A system, as set forth in claim 1, wherein the network coupling the computer system and the remote device utilizes wireless transmission of data.

13. A system, as set forth in claim 1, the remote device allowing a user to place a wager on at least one of the races.

14. A system, as set forth in claim 1, wherein the race information further includes at least one of track conditions, changes related to the race, exotic odds information, wager pool totals, combination wager odds, will pays information, race results, and exotic results.

15. A system, as set forth in claim 1, the remote device allowing a user to view a live video feed of a race.

16. A system, as set forth in claim 1, the remote device allowing a user to hear a live audio feed of a race.

17. A system, as set forth in claim 1, the unified user interface for allowing a user to select the plurality of races from a large set of races.

18. A method of relaying race information related to a plurality of races from a computer system to a remote device, the remote device coupled to the computer system via a network, and each race including a plurality of entrants, located on a racetrack, and employing at least one totalisator for tracking race information, comprising:

receiving and storing current race information on the computer system from the at least one totalisator, wherein the race information includes odds of winning associated with each entrant;

allowing a user, at the remote device, to select a subset of races from the plurality of races and sending the subset of races to the computer system;

filtering, by the computer system, the race information based on the subset of races;

receiving, at the remote device, filtered initial race information from the computer system;

comparing, at the computer system, the initial race information with the current race information and sending to the remote device filtered updated race information, the filtered updated race information including only race information that has changed since the initial race information was sent to the remote device;

delivering the filtered race information to a user via a display;

providing a unified user interface displayed on the display; and simultaneously displaying the filtered updated race information for the plurality of races including the odds of winning at least two different races located on at least two different racetracks on the unified user interface.

19. A method, as set forth in claim 18, further comprising comparing, at the computer system, the updated race information with the current race information and sending to the remote device further updated race information, the further updated race information including only race information that has changed since the updated race information was sent to the remote device.

20. A method, as set forth in claim 18, wherein the computer system includes at least one server computer located at a central location.

21. A method, as set forth in claim 18, wherein the remote device is one of a computer terminal, a personal computer, a telephone, a laptop computer, a notebook computer, a portable gaming device, and a personal digital assistant.

22. A method, as set forth in claim 18, each race being run at a racetrack, the race at a respective racetrack being a next race to be run.

23. A method, as set forth in claim 18, further comprising allowing a user to select a plurality of racetracks from a larger set of racetracks, the plurality of races corresponding to a next race to be run at each selected racetrack.

24. A method, as set forth in claim 18, further comprising preparing a data package, at the computer system, containing the updated race information at periodic intervals and transmitting the data package to the remote device.

25. A method, as set forth in claim 24, the data package including a data message sequence which identifies the race information which has been updated.

26. A method, as set forth in claim 18, the race information including at least first and second pieces of data, the remote device receiving updated race information pertaining to the first piece of data at a first periodic interval and receiving updated race information pertaining to the second piece of data at a second periodic interval.

27. A method, as set forth in claim 18, the network coupling the computer system and the remote device and utilizing wireless transmission of data.

28. A method, as set forth in claim 18, further comprising allowing a user to place a wager on at least one of the races.

29. A method, as set forth in claim 18, wherein the race information further includes track conditions, changes related to the race, exotic odds information, wager pool totals, combination wager odds, will pays information, race results, and exotic results.

30. A method, as set forth in claim 18, further comprising allowing a user to view a live video feed of a race on the remote device.

31. A method, as set forth in claim 18, further comprising allowing a user to hear a live audio feed of a race on the remote device.

32. A method, as set forth in claim 18, further comprising allowing a user to select the plurality of races from a large set of races.

33. A method, as set forth in claim 18, further comprising allowing a user to select a plurality of race tracks, each of the plurality of races being located at one of the plurality of racetracks.

34. A method, as set forth in claim 33, the unified user interface including a plurality of strips, each strip corresponding to one of the plurality of racetracks and displaying the updated race information pertaining to at least one race located at the corresponding racetrack.

* * * * *